United States Patent
Svorc

(10) Patent No.: US 9,065,335 B2
(45) Date of Patent: Jun. 23, 2015

(54) ARTIFICIAL RAMP GENERATING IN PWM MODULATOR FOR CURRENT CONTROL MODE

(71) Applicant: Dialog Semiconductor GmbH, Kirchheim/Teck-Nabern (DE)

(72) Inventor: Jindrich Svorc, Swindon (GB)

(73) Assignee: Dialog Semiconductor GmbH, Kirchheim/Tech-Nabern (DE)

( * ) Notice: Subject to any disclaimer, the term of this patent is extended or adjusted under 35 U.S.C. 154(b) by 24 days.

(21) Appl. No.: 13/649,189

(22) Filed: Oct. 11, 2012

(65) Prior Publication Data

US 2014/0097823 A1    Apr. 10, 2014

(30) Foreign Application Priority Data

Oct. 5, 2012   (EP) ..................... 12368030

(51) Int. Cl.
  *G05F 3/08* (2006.01)
  *H02M 3/158* (2006.01)
  *H02M 1/00* (2007.01)

(52) U.S. Cl.
  CPC ...... *H02M 3/158* (2013.01); *H02M 2001/0009* (2013.01)

(58) Field of Classification Search
  None
  See application file for complete search history.

(56) References Cited

U.S. PATENT DOCUMENTS

| | | | |
|---|---|---|---|
| 4,015,191 A | 3/1977 | Okumura | |
| 6,897,698 B1* | 5/2005 | Gheorghiu et al. | 327/231 |
| 7,166,991 B2* | 1/2007 | Eberlein | 323/280 |
| 7,589,517 B1 | 9/2009 | Broach et al. | |
| 8,019,294 B2 | 9/2011 | Ojanen et al. | |
| 8,248,046 B2* | 8/2012 | Hasegawa | 323/271 |
| 8,330,442 B2* | 12/2012 | Han et al. | 323/282 |
| 2005/0052249 A1* | 3/2005 | Gan et al. | 331/23 |
| 2007/0164720 A1* | 7/2007 | Lalithambika et al. | 323/288 |
| 2007/0182392 A1* | 8/2007 | Nishida | 323/282 |
| 2010/0066333 A1* | 3/2010 | Noda | 323/282 |
| 2011/0018507 A1* | 1/2011 | McCloy-Stevens et al. | 323/271 |
| 2012/0119718 A1* | 5/2012 | Song | 323/282 |
| 2013/0015830 A1* | 1/2013 | Zhang | 323/282 |

OTHER PUBLICATIONS

Anonymously authored technical disclosure, Mar. 28, 2007, "A Programmable Slope Generator for Current-Mode Control of Switching Regulators," (IP.com Electronic Publication No. IPCOM000147838D).*

European Search Report 12368030.8-1809 Mail date—Feb. 21, 2013, Dialog Semiconductor GmbH.

* cited by examiner

*Primary Examiner* — Timothy J Dole
*Assistant Examiner* — Monica Mata
(74) *Attorney, Agent, or Firm* — Saile Ackerman LLC; Stephen B. Ackerman

(57) ABSTRACT

Circuits and related methods for artificial ramp generation for pulse-width modulators (PWM) for current control mode switch mode power supplies (SMPS) are disclosed. The artificial ramp generation is separated from a current sensing part and allows easy trimming of both paths. Artificial ramp is generated as a voltage on a capacitor biased by constant current and placed between a voltage sensing node and an input of a PWM comparator. The circuit disclosed reduces circuit complexity and susceptibility to noise and spikes from the input voltage.

16 Claims, 4 Drawing Sheets

ARTIFICIAL RAMP GENERATING IN PWM MODULATOR FOR CURRENT CONTROL MODE

BACKGROUND (1) Field of the Disclosure

This disclosure relates generally to the field of PWM Modulation in current mode switching mode power supplies and relates in particular to artificial ramp generating in PWM modulators.

(2) Description of the Background

Switched-mode power supplies (SMPS) are getting more and more popular to supply especially mobile electronic devices with a stable DC output voltage. SMPS devices comprise usually a saw-tooth current generator, which produce saw-tooth shaped current.

SMPS circuits require usually saw-tooth-voltage generating circuits. Switching mode power supplies (SMPS) are one kind of DC to DC converters. It is a challenge to achieve in the output low values of ripple voltage. Furthermore, since mobile electronic devices are price-sensitive devices, it is very important to achieve correctly operating saw-tooth generators at low cost.

SUMMARY OF THE DISCLOSURE

A principal object of the present disclosure is to achieve saw-tooth signals with low complexity and hence with low cost.

A further object of the present disclosure is to decrease the DC voltage level of the saw-tooth signals.

A further object of the present disclosure is to allow easy trimming of the saw-tooth generator.

A further object of the present disclosure is to reduce the susceptibility to noise and spikes from the input voltage.

In accordance with the objects of this disclosure a method for artificial ramp signal generation for pulse-width modulators for current control mode switch mode power supplies has been achieved. The method disclosed comprises the steps of (1) providing a current mode control circuit of a switch current mode power supply comprising a current sensing circuit, measuring a current through an inductor, a current amplifier, amplifying the current measurement signal, and a PWM comparator, (2) removing a biasing pedestal current from an output of the current amplifier by subtracting the biasing pedestal current portion from the current amplifier output current, wherein the biasing pedestal current is biasing the current amplifier, (3) converting output current of current amplifier to voltage at a voltage sense node after pedestal current has been subtracted, and (4) generating artificial ramp signals as a voltage on a capacitor biased by a constant current source and placed between the voltage sense node and an input of the PWM comparator.

In accordance with the objects of this disclosure a circuit for artificial ramp signal generation for pulse-width modulators for current control mode switch mode power supplies (SMPS) has been achieved. The circuit disclosed firstly comprises: an input port connected to a current sensing circuit, said current sensing circuit measuring a current through an inductor of the SMPS, wherein the measurement result is amplified by a current amplifier, and said current amplifier having an output wherein the output current comprises the measurement result amplified plus a pedestal current and the output is connected to a first constant current source and to a voltage sense node. Furthermore the circuit comprises said first constant current source generating a current of a value of about the pedestal current, wherein the current generated by the current source is subtracted from the output current of the amplifier in order to have the current at the voltage sense node free from the portion of the pedestal current, a resistor connected between the voltage sense node and the ground, and a capacitor connected between the voltage sense node and a first input of a PWM comparator, wherein the capacitor is discharged after each clock period by two switches. Moreover the circuit disclosed comprises a second bias current source charging the capacitor, said two switches, wherein each terminal of the capacitor is connected via one switch to ground, and said PWM comparator.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present disclosure disclose circuits and related methods for artificial ramp generation for pulse-width modulators (PWM) for current control mode switch mode power supplies (SMPS).

SMPS circuits require usually saw-tooth-voltage generating circuits. The saw-tooth current is added to a current, which is proportional to an inductor current of the SMPS device in order to generate a pulse-width modulated (PWM) control signal and avoid large signal instability above 50% duty-cycle.

Electronic mobile devices are marketed in a highly competitive market and therefore there is a need for a low-cost reliable saw-tooth generator, i.e. a generator avoiding a highly complex circuit, without difficult trimming requirements and with low susceptibility to noise and spikes from the input voltage.

Figure 1:
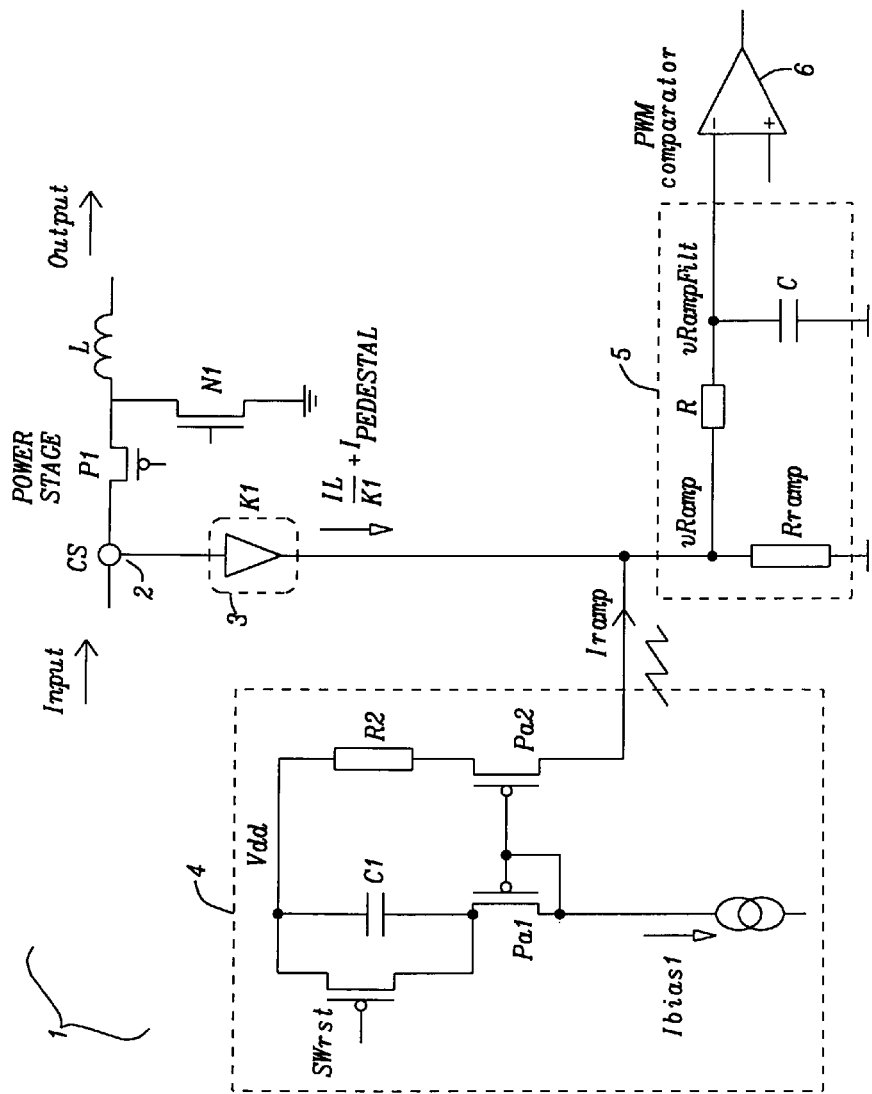
FIG. 1 shows a block diagram of a current mode control circuit

FIG. 1 shows a block diagram of a current mode control circuit 1. The circuit 1 consists of a current sensing circuit CS 2, current amplifier K1 3, saw-tooth current generator 4 comprising capacitor C1, resistor R1, and transistors Pa1, Pa2, (simplified), which produce saw-tooth shape current Iramp, a summing circuit 5 realized by resistor Rramp and low-pass filter R-C (simplified) with one or more poles to suppress spikes and other noise from the input voltage. During the period when the power transistor PMOS P1 is turned on the current sensing circuit CS 2 is measuring the current flowing through inductor L, this signal is multiplied by 1/K1 in the current amplifier K1 3, added to the pedestal current $I_{Pedestal}$ and summed with the saw-tooth shaped current $I_{RAMP}$ from the artificial ramp generator 4. This results to the vRamp voltage which is fed through the low-pass filter R-C to the input of the PWM comparator 6. The artificial ramp current $I_{RAMP}$ is reset by signal SWrst at the end of each clock-cycle.

The second input of the PWM comparator 6 is the output of an error amplifier (not shown), which compares the output voltage with a reference voltage. Usually an operational amplifier with compensation network is used for such an error amplifier. The signal of the second input of the PWM comparator 6 is usually called "Error" or "Verror".

This solution works pretty well but still has a few drawbacks:

The artificial ramp generator 4, illustrated in FIG. 1 in a very simplified way, is in reality much more complex.

The voltage on the net vRamp is artificially increased due to pedestal current from the current amplifier K1 3.

Pedestal voltage on net vRamp cannot be easily trimmed since trimming of this resistor would change the transfer function of whole loop (current path is not split from the artificial ramp).

Because of the parasitic inductance of the bonding wires, board (PCB), etc. the input voltage and the output of the current amplifier K1 3 can go significantly lower and reach the level of vRamp. In this situation the current amplifier. K1 3 is out of its desired operation point and does not work correctly. This possibly leads to undesired early or late triggering of the PWM comparator 6. Therefore it would be better to keep the vRamp voltage low and don't artificially add any voltage on top of the valid saw-tooth signal.

Figure 2:
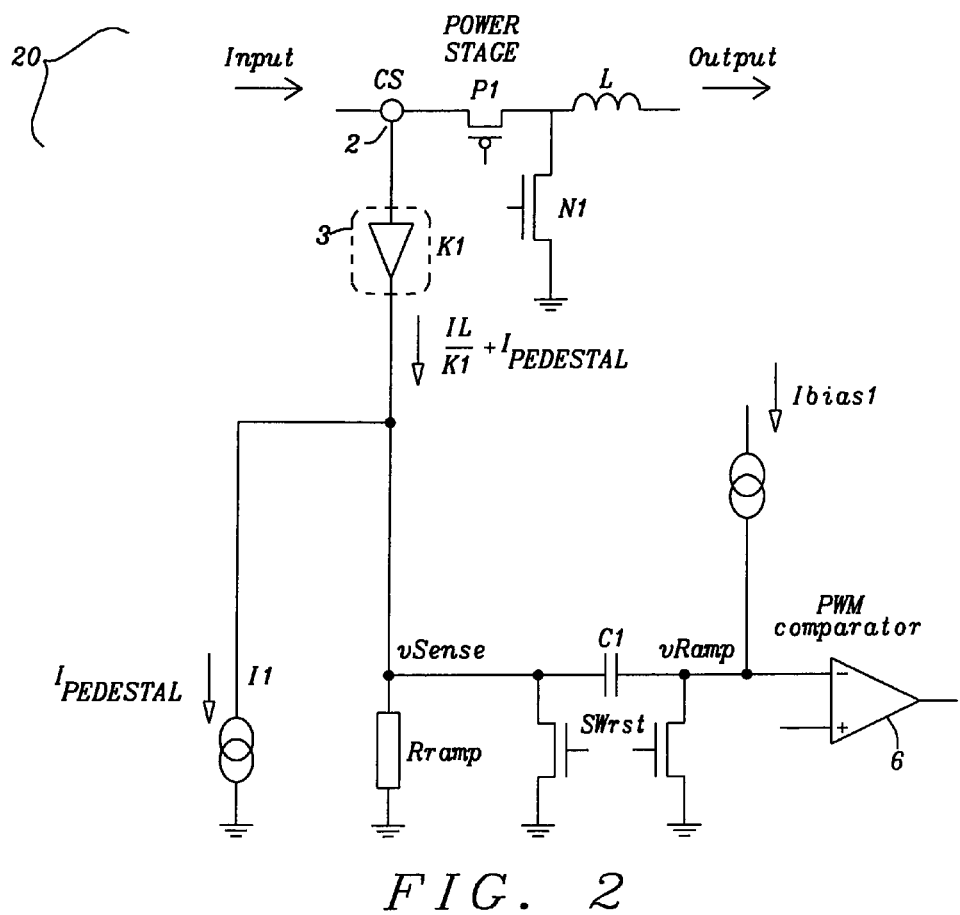
FIG. 2 shows a simplified schematic of an enhanced current mode control circuit.

In order to overcome the disadvantages outlined above a further enhanced embodiment of a ramp generator is disclosed. FIG. 2 shows a simplified schematic of an enhanced current mode control circuit 20.

The power stage and the current sensing amplifier have not been changed compared to the circuit of FIG. 1. The solution shown in FIG. 2 introduces a new current source I1, which compensates the $I_{PEDESTAL}$ current from the current amplifier K1 3 output.

It should be noted that in a preferred embodiment of the disclosure the gain of the current amplifier is 1/K1 in line as shown in FIG. 1. The gain of the amplifier is given as (Output current of the amplifier)/(current in the coil) and this ratio is in the order of magnitude of $1 \times 10^{-6}$ to $10 \times 10^{-6}$. (or the constant K1 is around 100000-1000000)

Compensating $I_{PEDESTAL}$ provides clear information about the current in the coil L without any pedestal current. The current is converted to the voltage on resistor $R_{ramp}$ and generates voltage vSense which is proportional to the current in the coil L and does not contain any artificial ramp. The additional I1 current does not increase the total power consumption compared to the circuit of FIG. 1 because this current was previously drawn by the resistor $R_{ramp}$.

The pedestal current is in fact a bias current (or copy of bias current) for the current amplifier. The current source I1 should be derived from the same current mirror as a bias current for the amplifier in order to get good matching.

The most important device is the capacitor C1, placed in between the nets Vsense and Vramp. This capacitor C1 is charged from the current source with static current Ibias1 with the same value as the Ibias1 current in FIG. 1. The voltage on capacitor C1 is simply added to the voltage vSens and to the voltage vRamp corresponds to the same voltage of the circuit of FIG. 1. This voltage is fed to the first input of the PWM comparator 6.

Capacitor C1 is discharged at the end of each switching period by the pair of switches SWrst. These switches assure full discharging of the capacitor C1 at the beginning of each switching cycle.

In reality the current source I1 is set a bit lower than $I_{pedestal}$ in order to keep the circuit 20 well biased. The current source I1 is created in a preferred embodiment by an NMOS current mirror and the output NMOS transistor has to be operated in saturation (to assure correct mirror ratio) So it needs drain-source voltage Vds>(Vgs–Vth). It means the difference of these two currents flowing through resistor Rramp must produce this drain-source voltage Vds. In a preferred embodiment it is e.g. in the order of magnitude usually of about 100-150 mV The circuit of FIG. 2 allows simple trimming of both components of the final vRamp, the current sense ratio and the artificial ramp size. The current sense ratio can be easily trimmed by trimming the Rramp resistor and the artificial ramp is trimmed by changing the Ibias current.

Figure 3:
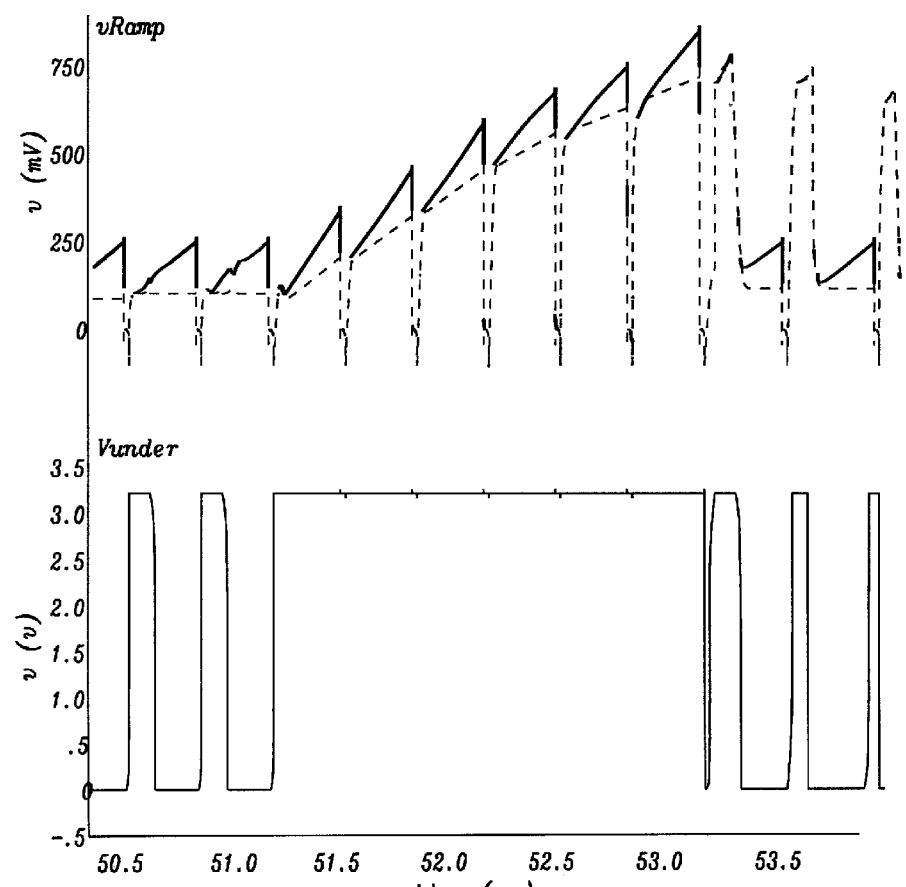
FIG. 3 shows basic simulation results of full CMOS buck converter.

FIG. 3 shows basic simulation results of full CMOS buck converter. It shows the voltage vRamp 30 and the output of comparator 6 namely voltage $V_{under}$ 31. The curves 30 and 31 illustrate how the pulse-width modulator reacts to an increase of vRamp, which is proportional to an increase of the current through the inductor L.

Figure 4:
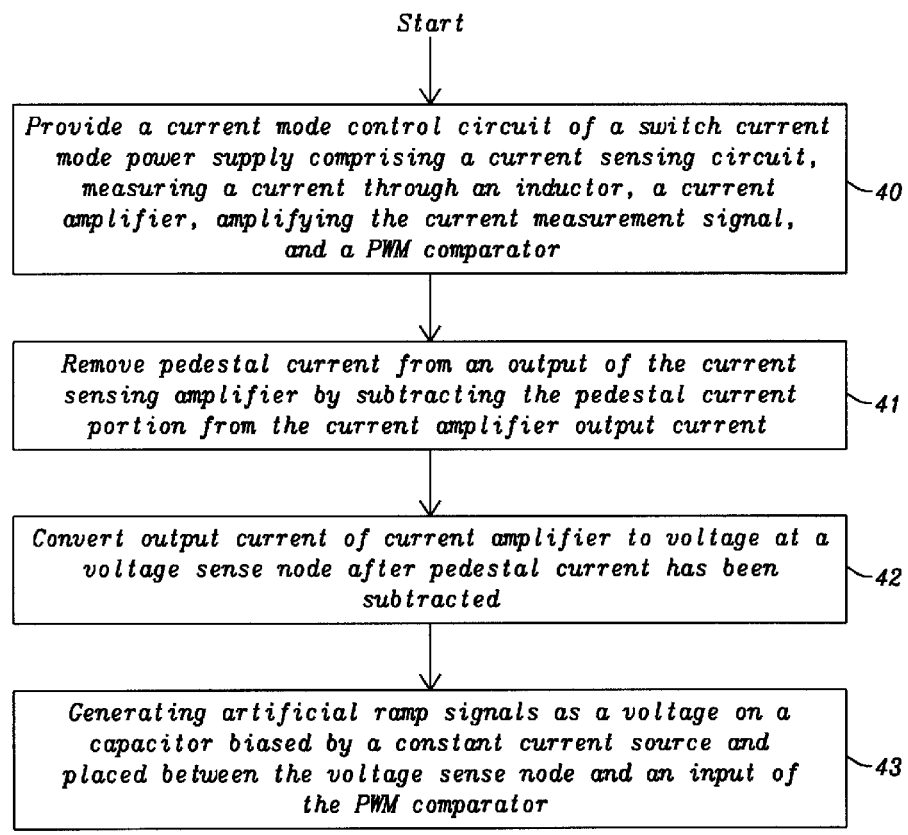
FIG. 4 illustrates a flowchart of a method to perform code profiling for processing devices having a low duty cycle.

FIG. 4 illustrates a flowchart of a method for artificial ramp signal generation for pulse-width modulators (PWM) for current control mode switch mode power supplies. A first step 40 describes the provision of a current mode control circuit of a switch current mode power supply comprising a current sensing circuit, measuring a current through an inductor, a current amplifier, amplifying the current measurement signal, and a PWM comparator. Step 41 illustrates removing pedestal current from an output of the current amplifier by subtracting the pedestal current portion from the current amplifier output current. Step 42 shows converting output current of current amplifier to voltage at a voltage sense node after pedestal current has been subtracted. Step 23 depicts generating artificial ramp as a voltage on a capacitor biased by a constant current source and placed between the voltage sense node and an input of the PWM comparator.

While the disclosure has been particularly shown and described with reference to the preferred embodiments thereof, it will be understood by those skilled in the art that various changes in form and details may be made without departing from the spirit and scope of the disclosure.

What is claimed is:

1. A method for artificial ramp signal generation for pulse-width modulators for current control mode switch mode power supplies, comprising the steps of
   (1) providing a current mode control circuit of a switch current mode power supply comprising a current sensing circuit measuring an output current of the pulse-width modulator through an inductor, a current amplifier, amplifying the current measurement signal, one biasing constant current source configured to charging a ramp signal generating capacitor, a pedestal constant current source configured to generating a current used to removing a pedestal current from an output of the current amplifier, and a PWM comparator;
   (2) removing a biasing pedestal current from an output of the current amplifier by subtracting the biasing pedestal current portion from the current amplifier output current, wherein the biasing pedestal current is biasing the current amplifier;
   (3) converting output current of current amplifier to voltage at a voltage sense node after pedestal current has been subtracted, wherein the output of the current amplifier is directly connected to the voltage sense node; and
   (4) generating artificial sawtooth ramp signals as a voltage on a capacitor biased by one ramp biasing constant current source and placed between the voltage sense node and an input of the PWM comparator, wherein a first terminal of the capacitor is connected to a first input terminal of the PWM comparator and a second terminal of the capacitor is connected to the voltage sense node and wherein the current generated by the one biasing constant current source biasing the capacitor is fed to the capacitor on the side of the first terminal of the capacitor.

2. The method of claim 1 wherein the current output of the current amplifier has a value of $Iout=I_L/K1+I_{PEDESTAL}$;
wherein $I_L$ is the current through the inductor, K1 is an amplification factor of the current amplifier, and $I_{PEDESTAL}$ is a biasing current of the current amplifier.

3. The method of claim 1 wherein the biasing pedestal current is removed by a second pedestal current generated by a pedestal constant current source.

4. The method of claim 3 wherein the second pedestal current is generated from a same current mirror as the biasing pedestal current, wherein an output transistor of the current mirror generating the second pedestal current is operated in saturation mode.

5. The method of claim 1 wherein the voltage at the voltage sense point is decreased by subtracting the pedestal current from the output current of the current amplifier between the voltage sense point and the output of the current amplifier.

6. The method of claim 1 wherein the current conversion is performed by a resistor $R_{RAMP}$ connected between the voltage sense node and ground.

7. The method of claim 6 wherein a difference between the biasing pedestal current and the second pedestal current generates a voltage across the resistor required for a drain-source voltage of an output transistor of a current mirror of the second current source generating the second pedestal current.

8. The method of claim 1 wherein the capacitor is charged by the one biasing constant current source generating a static bias current and is discharged at the end of each switching cycle.

9. The method of claim 7 wherein the capacitor is discharged by two switches, wherein a switch is connected between each terminal of the capacitor and ground.

10. The method of claim 1 wherein a gain of the current amplifier is about in the order of magnitude of $5\times10^{-6}$.

11. A circuit for artificial ramp signal generation for pulse-width modulators for current control mode switch mode power supplies (SMPS), comprising:
an input port connected to a current sensing circuit;
said current sensing circuit capable of measuring a current through an inductor of the SMPS, wherein the measurement result is amplified by a current amplifier;
said current amplifier configured to having an output current comprising the measurement result amplified plus a biasing pedestal current and the output is connected directly to an output of a pedestal constant current source and to a voltage sense node;
said pedestal constant current source capable of generating a current of a value of about the pedestal current, wherein the current generated by the pedestal constant current source is subtracted from the output current of the amplifier in order to have the current at the voltage sense node free from the portion of the pedestal current;
a resistor connected between the voltage sense node and ground;
a capacitor, configured to generating a sawtooth pulse, connected between the voltage sense node and a first input of a PWM comparator, wherein the capacitor is discharged after each clock period by two switches, wherein a first terminal of the capacitor is connected to a first input terminal of the PWM comparator and a second terminal of the capacitor is connected to the voltage sense node and wherein a current generated by one biasing constant current source biasing the capacitor is fed to the capacitor on the side of the first terminal of the capacitor;
said one biasing constant current source capable of biasing the capacitor;
said two switches, wherein each terminal of the capacitor is connected via one switch to ground; and
said PWM comparator.

12. The circuit of claim 11 wherein current output of the current amplifier has a value of $Iout=I_L/K1+I_{PEDESTAL}$;
wherein $I_L$ is the current through the inductor and, K1 is an amplification factor of the current amplifier.

13. The circuit of claim 11 wherein the biasing constant current source generates a current which is lower than the pedestal current.

14. The circuit of claim 11 wherein the voltage at the voltage sense node is proportional to the current through the inductor of the SMPS.

15. The circuit of claim 11 wherein said capacitor is discharged at the end of each switching period by said switches.

16. The circuit of claim 11 wherein a gain of the current amplifier is about in the order of magnitude of $5^{-6}$.

* * * * *